(12) United States Patent
Smith et al.

(10) Patent No.: US 10,323,721 B1
(45) Date of Patent: Jun. 18, 2019

(54) MARINE DRIVES AND ASSEMBLIES FOR SUPPORTING AN OUTPUT GEAR IN A MARINE DRIVE

(71) Applicant: Brunswick Corporation, Mettawa, IL (US)

(72) Inventors: Joshua S. Smith, Mayville, WI (US); Kass W. Sawyer, Neenah, WI (US); Theodore J. Hanes, Fond du Lac, WI (US)

(73) Assignee: Brunswick Corporation, Mettawa, IL (US)

( * ) Notice: Subject to any disclaimer, the term of this patent is extended or adjusted under 35 U.S.C. 154(b) by 0 days.

(21) Appl. No.: 15/958,704

(22) Filed: Apr. 20, 2018

(51) Int. Cl.
| | |
|---|---|
| *B63H 5/10* | (2006.01) |
| *F16H 3/14* | (2006.01) |
| *F16H 63/30* | (2006.01) |
| *F16H 37/12* | (2006.01) |
| *B63H 20/20* | (2006.01) |

(52) U.S. Cl.
CPC .............. *F16H 3/145* (2013.01); *B63H 5/10* (2013.01); *B63H 20/20* (2013.01); *F16H 37/122* (2013.01); *F16H 63/302* (2013.01); *B63H 2005/106* (2013.01)

(58) Field of Classification Search
CPC ...... F16H 3/145; F16H 37/122; F16H 63/302; B63H 5/10; B63H 20/20; B63H 2005/106
See application file for complete search history.

(56) References Cited

U.S. PATENT DOCUMENTS

| | | |
|---|---|---|
| 3,727,574 A | 4/1973 | Bagge |
| 4,397,198 A | 8/1983 | Borgersen et al. |
| 6,544,083 B1 | 4/2003 | Sawyer et al. |
| (Continued) | | |

FOREIGN PATENT DOCUMENTS

| | | |
|---|---|---|
| RU | 1380118 A1 | 12/1995 |
| SU | 378381 A2 | 4/1973 |

OTHER PUBLICATIONS

Sawyer et al., "Marine Drives and Assemblies for Supporting an Output Gear in a Marine Drive", U.S. Appl. No. 14/268,622, filed May 2, 2014.
(Continued)

*Primary Examiner* — Stephen P Avila
(74) *Attorney, Agent, or Firm* — Andrus Intellectual Property Law, LLP

(57) ABSTRACT

A marine drive includes an output gear including a beveled gear and a hub. A propeller shaft extends through the hub. A first bearing and an adjacent second bearing are located on the hub and support rotation of the output gear. The first and second bearings have inner races and outer races. An inner spacer is located on the hub and sandwiched between the respective inner races of the first and second bearings. An outer spacer is sandwiched between the respective outer races of the first and second bearings. A bearing carrier surrounds the propeller shaft and holds the first and second bearings therein by way of a press fit. The inner and outer spacers and the bearing carrier are dimensionally sized to provide a dimensional preload on the first and second bearings to maintain the output gear in alignment with the propeller shaft during operation of the marine drive.

20 Claims, 5 Drawing Sheets

(56) References Cited

U.S. PATENT DOCUMENTS

| | | | | |
|---|---|---|---|---|
| 6,783,137 | B2 * | 8/2004 | Nagreski | B60G 7/008 |
| | | | | 280/124.135 |
| 6,817,461 | B1 | 11/2004 | Sawyer et al. | |
| 6,929,518 | B1 | 8/2005 | Sawyer et al. | |
| 8,435,090 | B1 | 5/2013 | Lonnborg et al. | |
| 8,616,929 | B2 | 12/2013 | Kawaguchi | |
| 9,174,715 | B1 | 11/2015 | Hanes et al. | |
| 9,731,804 | B1 | 8/2017 | Hanes et al. | |
| 9,896,177 | B1 | 2/2018 | Tuchscherer et al. | |
| 2007/0287339 | A1 * | 12/2007 | Bristol | F16C 25/08 |
| | | | | 440/38 |
| 2008/0283351 | A1 | 11/2008 | Sasaki et al. | |
| 2010/0247016 | A1 * | 9/2010 | Rivett | F16C 25/06 |
| | | | | 384/563 |
| 2011/0195620 | A1 | 8/2011 | Davis et al. | |
| 2011/0223818 | A1 | 9/2011 | Lonngren et al. | |
| 2012/0231683 | A1 | 9/2012 | Kawaguchi | |
| 2013/0312559 | A1 | 11/2013 | Tanaka et al. | |
| 2013/0315521 | A1 | 11/2013 | Fujiwara | |
| 2014/0057507 | A1 | 2/2014 | Kuriyagawa et al. | |
| 2017/0159705 | A1 * | 6/2017 | Hikosaka | B63H 20/14 |

OTHER PUBLICATIONS

Tuchscherer et al., "Shift System for a Marine Drive", U.S. Appl. No. 15/239,516, filed Aug. 17, 2016.

Tuchscherer et al., "Marine Drives Having Exhaust Systems that Discharge Exhaust Gas Through a Gearcase Housing", U.S. Appl. No. 15/414,854, filed Jan. 25, 2017.

Smth et al., "System and Method for Controlling Propulsion of a Marine Vessel", U.S. Appl. No. 15/886,572, filed Feb. 1, 2018.

Tuchscherer et al., "Marine Drives Having Exhaust Systems that Discharge Exhaust Gas Through a Gearcase Housing" U.S. Appl. No. 15/901,269, filed Feb. 21, 2018.

AST Bearings LLC, "Technical Information: Bearing Tolerances," Document No. ENB-04-0554 REV. A DCR14-109, Copyright 2010.

MerCruiser Drives and Transoms, Mercury University, 2010-2011 Technician Guide No. 90-899907005 810, Copyright 2010.

NTN, "Ball and Roller Bearings," catalog, Copyright 2015, pp. A-35 to A-48.

Yamaha, "F350 LF350 Service Manual," LIT-18616-03-02, printed Jul. 2007, p. 7-41.

* cited by examiner

MARINE DRIVES AND ASSEMBLIES FOR SUPPORTING AN OUTPUT GEAR IN A MARINE DRIVE

FIELD

The present disclosure relates to marine drives, and particularly to marine drives having a rotating propeller shaft and assemblies for supporting an output gear of marine drives.

BACKGROUND

The following U.S. Patents are incorporated herein by reference and provide background information regarding the present disclosure.

U.S. Pat. No. 8,435,090 discloses a marine drive having a gear case that houses a vertical driveshaft that rotates a generally horizontal propulsor shaft in a forward direction upon operational engagement with a forwardly rotatable gear and a rearward direction upon operational engagement with a rearwardly rotatable gear. A lubricant exclusion cover is disposed between the forwardly and rearwardly rotatable gears so as to limit churning of lubricant by at least one of the forwardly and rearwardly rotatable gears.

U.S. Pat. No. 8,616,929 discloses a vessel propulsion apparatus including a second shaft that is inserted in a first driven gear and in a second driven gear, that is connected to a dog clutch, and that is arranged to undergo a thrust. The vessel propulsion apparatus includes a first bearing disposed between the first driven gear and the second shaft, a second bearing disposed between the second driven gear and the second shaft, and a case to which a thrust applied to the second shaft is transmitted via the first bearing and the first driven gear or via the second bearing and the second driven gear. The vessel propulsion apparatus includes an adjusting member disposed between the second shaft and at least one of the first driven gear and the second driven gear and arranged to apply a preload onto the first bearing and the second bearing.

U.S. Pat. No. 9,174,715 discloses an apparatus for a changing gear in a marine propulsion system. A cam rotates about a first axis with a shift shaft. The cam has a body and an arm that radially extends from the body with respect to the first axis. A cam follower moves parallel to a second axis that is perpendicular to the first axis to cause movement of a clutch, thereby enacting a gear change. The cam follower defines a pocket that is elongated with respect to the second axis and a recess that extends from the pocket along a third axis that is perpendicular to the first and second axes. The cam is disposed in the pocket and the arm extends into the recess. During a constant rotation of the shift shaft in a first direction about the first axis, the cam follower moves with respect to the second axis to enact the gear change and also dwells with respect to the second axis.

U.S. Pat. No. 9,896,177 discloses a marine drive comprising an internal combustion engine that effectuates rotation of the driveshaft, a propulsor driven into rotation by the driveshaft so as to effect thrust, and a transmission that shifts amongst a forward gear, a reverse gear, and a neutral gear. The marine drive has a gear case housing on the bottom portion and a driveshaft housing around the driveshaft and positioned between the internal combustion engine and the gear case housing. The marine drive has a shift rod rotatable about its own axis, wherein rotation of the shift rod about its own axis shifts the transmission amongst the forward gear, the reverse gear, and the neutral gear. The marine drive also comprises an actuator positioned in the driveshaft housing that effectuates the rotation of the shift drive about its own axis.

SUMMARY

This Summary is provided to introduce a selection of concepts that are further described in the following Detailed Description. This Summary is not intended to identify key or essential features of the claimed subject matter, nor is it intended to be used as an aid in limiting the scope of the claimed subject matter.

According to one example of the present disclosure, a marine drive includes an output gear connected to a driveshaft such that rotation of the driveshaft causes rotation of the output gear, wherein the output gear comprises a beveled gear and a hub that is transversely oriented with respect to the driveshaft. A propeller shaft is transversely oriented with respect to the driveshaft and extends through an open interior of the hub. A first bearing and an adjacent second bearing are located on the hub and support rotation of the output gear, wherein the first bearing is located closer to the beveled gear than the second bearing, and wherein each of the first and second bearings has an inner race and an outer race. The marine drive further includes an inner spacer located on the hub and sandwiched between the respective inner races of the first and second bearings and an outer spacer sandwiched between the respective outer races of the first and second bearings and a bearing carrier having an open interior that surrounds the propeller shaft and holds the first and second bearings therein by way of a press fit. The inner and outer spacers and the bearing carrier are dimensionally sized to provide a dimensional preload on the first and second bearings so as to maintain the output gear in alignment with the propeller shaft during operation of the marine drive.

According to another example of the present disclosure, a marine drive includes a driveshaft extending into a gear case of the marine drive, a propeller shaft transversely oriented with respect to the driveshaft and operably coupled to the driveshaft so as to be rotated thereby, and a gear assembly located in the gear case. The gear assembly includes an output gear connected to the driveshaft such that rotation of the driveshaft causes rotation of the output gear, wherein the output gear comprises a beveled gear and a hub that surrounds the propeller shaft. The gear assembly also includes a first bearing and an adjacent second bearing located on the hub and supporting rotation of the output gear, wherein the first bearing is located closer to the beveled gear than the second bearing, and wherein each of the first and second bearings has an inner race and an outer race. Additionally, the gear assembly includes an inner spacer located on the hub between the respective inner races of the first and second bearings and an outer spacer between the respective outer races of the first and second bearings, wherein the inner and outer spacers are dimensionally sized to provide a dimensional preload on the first and second bearings so as to maintain the output gear in alignment with the propeller shaft during operation of the marine drive. A retainer nut of the gear assembly is located on the hub adjacent the second bearing, opposite the first bearing.

BRIEF DESCRIPTION OF THE DRAWINGS

Examples of marine drives and assemblies for supporting output gears in marine drives are described with reference to the following figures. The same numbers are used throughout the figures to reference like features and like components.

DETAILED DESCRIPTION OF THE DRAWINGS

In the present description, certain terms have been used for brevity, clarity, and understanding. No unnecessary limitations are to be implied therefrom beyond the requirement of the prior art because such terms are used for descriptive purposes only and are intended to be broadly construed. The assemblies and methods described herein may be used alone or in combination with other assemblies and methods. Various equivalents, alternatives and modifications are possible within the scope of the appended claims.

Figure 1:
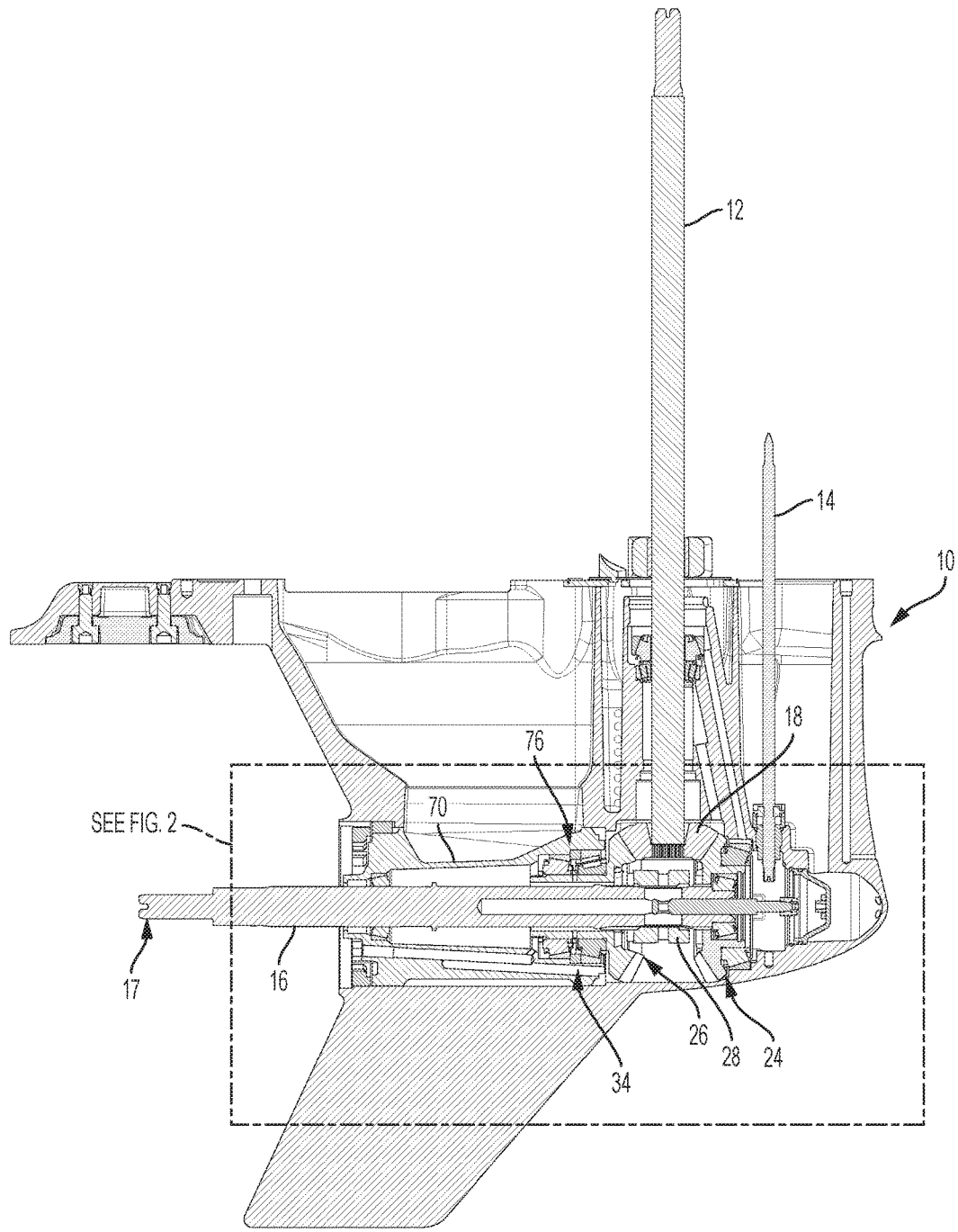
FIG. 1 is a perspective view of a gear case for a marine vessel.
Figure 2:
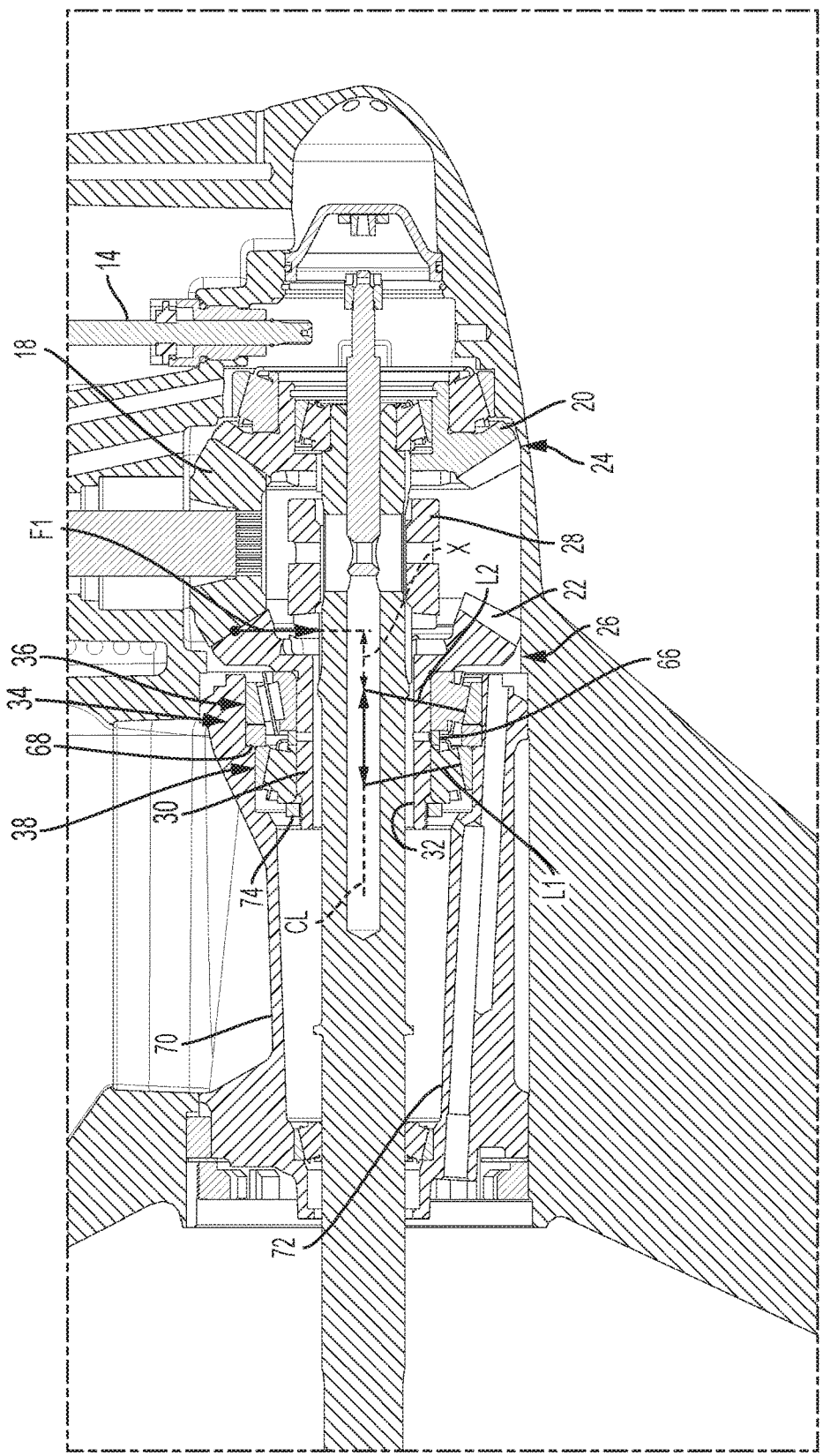
FIG. 2 is a view of section 2-2 taken in FIG. 1.

FIGS. 1 and 2 depict a gear case 10 for a marine drive, such as an outboard motor. A vertically-oriented driveshaft 12 and an adjacent, vertically-orientated shift shaft 14 extend into the gear case 10 of the marine drive. A propeller shaft 16 is transversely oriented with respect to the driveshaft 12 and is operably coupled to the driveshaft 12 such that rotation of the driveshaft 12 about its axis causes rotation of the propeller shaft 16 about its axis. The propeller shaft 16 has an outer end 17 that is configured for connection to one or more propellers (not shown) via a splined connection. Any other conventional type of connection could be used.

Referring to FIG. 2, the lower end of the driveshaft 12 has a beveled pinion 18 that rotates along with the driveshaft 12. The pinion 18 engages with bevel gears 20, 22 on oppositely-oriented first and second output gears 24, 26 connected to the driveshaft 12. Rotation of the driveshaft 12 about its axis causes corresponding rotation of the first and second output gears 24, 26. The first and second output gears 24, 26 rotate in opposite directions with respect to each other. Rotation of the shift shaft 14 about its own axis in a first direction actuates a clutch 28 that causes the propeller shaft 16 to engage with and rotate with one of the first and second output gears 24, 26 to achieve one of forward and reverse rotation of the propeller shaft 16 and associated propeller. Rotation of the shift shaft 14 about its own axis in an opposite, second direction actuates the clutch 28, which causes the propeller shaft 16 to engage with and rotate the other of the first and second output gears 24, 26 to achieve the other one of forward and reverse rotation of the propeller shaft 16 and associated propeller. The clutch 28 shown in FIG. 2 is a dog clutch; however, any conventional type of clutch for providing this type of connection can be utilized.

During research and experimentation, the present inventors have determined that in many instances the second output gear 26 has an operable life that is significantly less than the first output gear 24. This is especially true in prior art arrangements having counter-rotating propeller shafts. By experimentation, the present inventors have found that during rotation of the noted propeller(s), large moments are applied on the bearing(s) that supporting the second output gear 26. These moments cause the second output gear 26 to "tip" with respect to horizontal and thus become misaligned with respect to the propeller shaft 16 and bearing carrier 70.

This misalignment causes edge loading on the bearing(s), which can result in premature failure of the bearing(s), clutch 28, propeller shaft 16, or a propeller shaft front bearing. The present disclosure provides marine drives having assemblies, including bearing assemblies, designed to rectify these problems.

Figure 3:
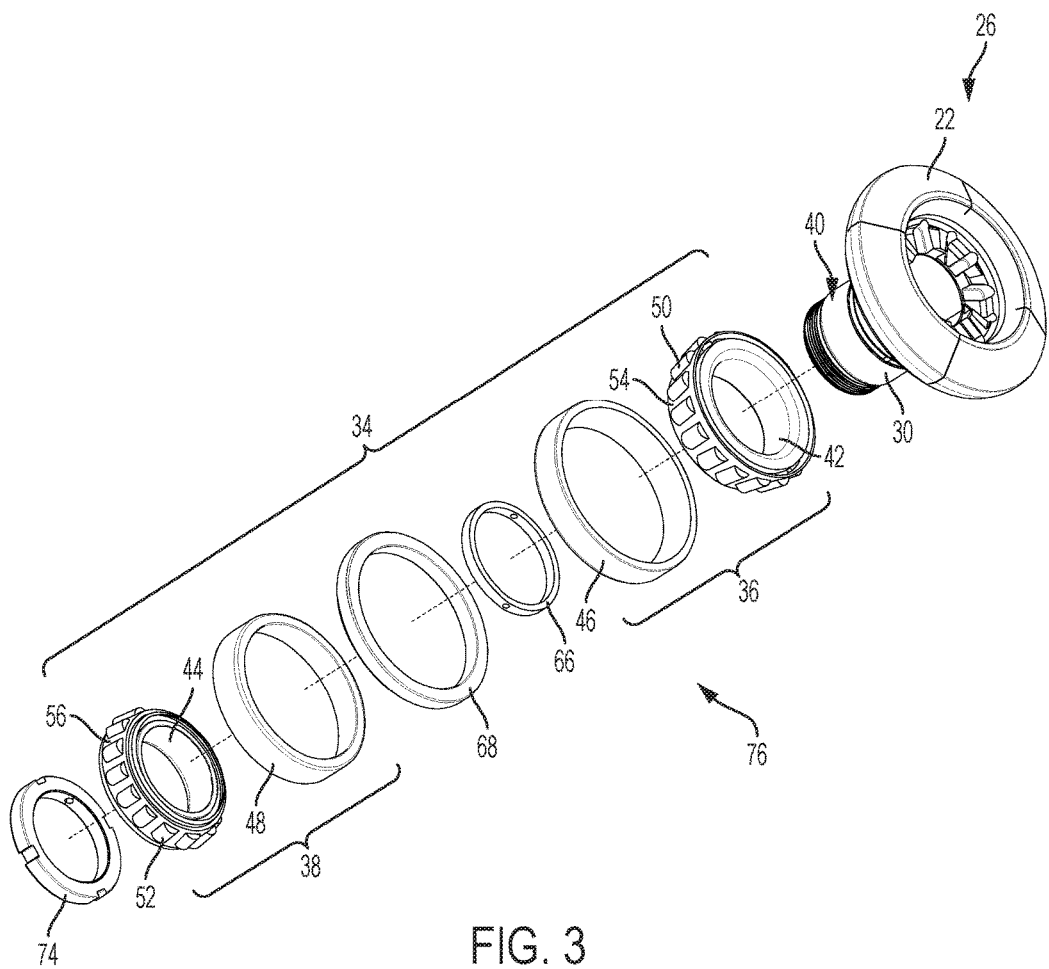
FIG. 3 is an exploded view of a bearing assembly according to the present disclosure.

As shown in FIGS. 2 and 3, the driveshaft 12 is operably connected to the bevel gear 22 via the pinion 18 so that rotation of the driveshaft 12 causes rotation of the second output gear 26. More specifically, the second output gear 26 includes a bevel gear 22 that engages (meshes) with and rotates with the pinion 18 on the driveshaft 12. The second output gear 26 also includes a hub 30 that is transversely oriented with respect to the driveshaft 12 and that has an open interior 32 through which the propeller shaft 16 extends. Rotation of the second output gear 26 causes simultaneous rotation of the hub 30. A bearing assembly 34 is located on the hub 30 and supports rotation of the hub 30. The bearing assembly 34 has a first bearing 36 and an adjacent second bearing 38 located on the hub 30 and supporting rotation of the second output gear 26. As shown in FIG. 2, the first bearing 36 is located closer to the bevel gear 22 and the driveshaft 12 than the second bearing 38. A retainer nut 74 is located on the hub 30 adjacent the second bearing 38, opposite the first bearing 36.

As best shown in FIG. 3, the bearing assembly 34 is located on the radially outer circumferential surface 40 of the hub 30. In this example, both the first and second bearings 36, 38 are tapered roller bearings, each having an inner race 42, 44 located on the outer circumferential surface 40; an outer race 46, 48; and a plurality of rollers 50, 52 located between the respective inner and outer races. Each of the first and second bearings 36, 38 has a bearing cage 54, 56 that contains the plurality of rollers 50, 52 between the respective inner and outer races. The inner race 42 of the first bearing 36 has a conical surface so as to set the axes of the plurality of rollers 50 at a first angle (i.e., not parallel to) the outer circumferential surface 40 of the hub 30. The inner race 44 of the second bearing 38 also has a conical surface so as to set the axes of the plurality of rollers 52 at a second angle (i.e., not parallel to) to outer circumferential surface 40 of the hub 30. The first and second bearings 36, 38 are arranged such that their respective effective load centers (acting along L1, L2, FIG. 2) are disposed so as to maximize a distance D there between.

Figure 4:
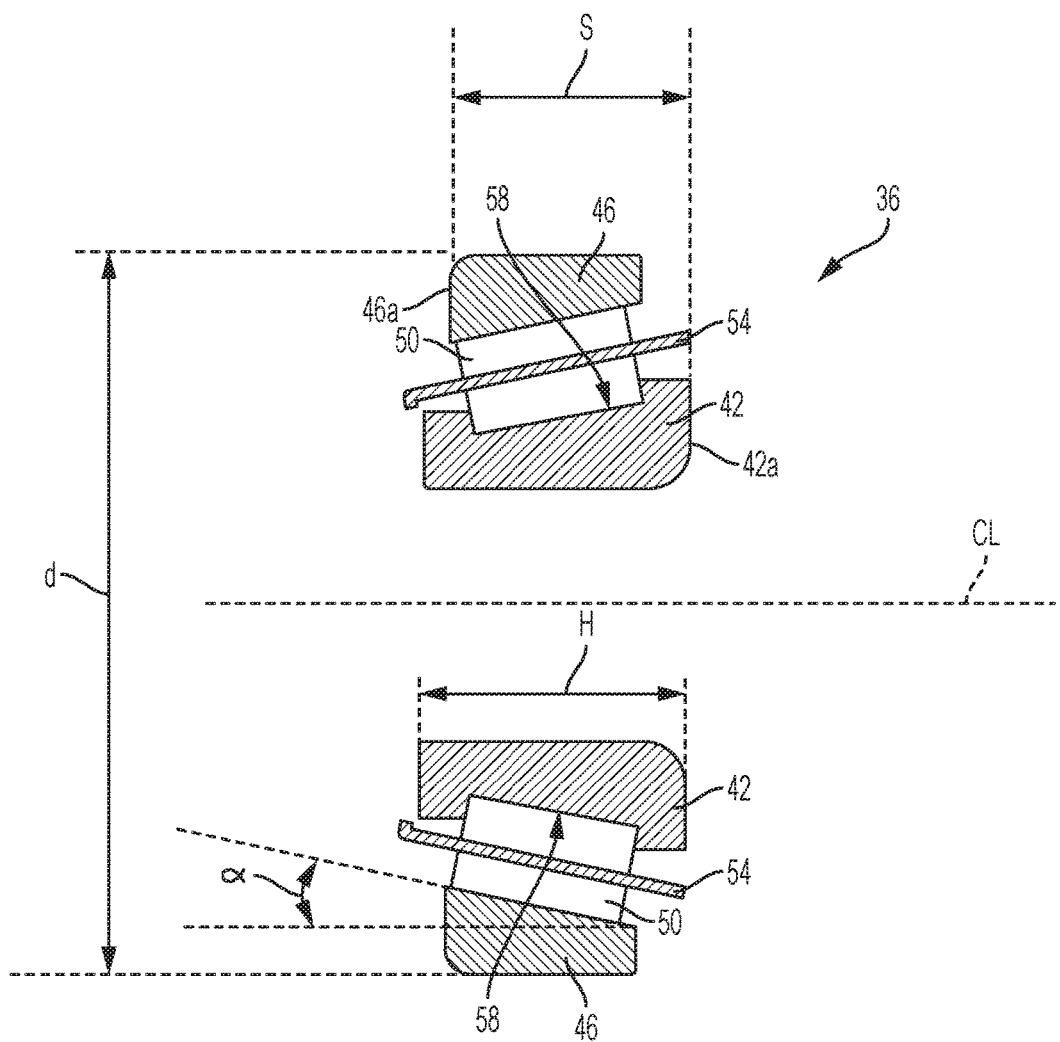
FIG. 4 is an annotated cross-sectional illustration of a tapered roller bearing.

FIG. 4 illustrates a cross section of a tapered roller bearing, and is used to describe some terminology referred to herein. Note that FIG. 4 shows a cross section through only one bearing, which here would be the first bearing 36. A dimension S between the back face 46a of the outer race 46 and the back face 42a of the inner race 42 is known as the "stand height." An angle α of the slope of the inner face of the outer race 46 with respect to a line that is parallel to the center line CL represents the "contact angle" and is half of what is known as the "cup angle." Note that these values are not necessarily constant. Instead, specific cup and cone angled surfaces are proprietary to each bearing manufacturer and may contain micro-profile modifications such that there is not necessarily one a value across the entire cup or cone width. Thus, an approximation of the cup angle may need to be made in order to carry out portions of the method described herein below. The cup diameter is shown as d. The value H represents the height of the inner race 42.

The exact type of bearing assembly 34 can vary from what is shown in FIGS. 2-4, so long as the bearings in the assembly 34 are able to axially react against one another to create a dimensional preload. For example, the tapered roller bearings could be oriented differently with respect to one another, such that their effective load centers L1, L2 are angled toward one another. In another example, the first and second bearings 36, 38 could be replaced by ball bearings. In still another example, the first bearing 36 is an angular contact ball bearing, and the second bearing 38 is a tapered roller bearing. Using a less expensive ball bearing for one or both bearings in the bearing assembly 34 might be particularly suited to a right-hand gear case, wherein the second output gear 26 is the reverse gear, and thus experiences a lighter duty cycle than does the forward gear.

According to the present disclosure, the marine drive further includes an inner spacer 66 located on the hub 30 and sandwiched between the respective inner races 42, 44 of the first and second bearings 36, 38 and an outer spacer 68 sandwiched between the respective outer races 46, 48 of the first and second bearings 36, 38. The marine drive also includes a bearing carrier 70 having an open interior 72 that surrounds the propeller shaft 16 and holds the first and second bearings 36, 38 therein. The at least one of the inner and outer spacers 66, 68 and the bearing carrier 70 are dimensionally sized to provide a dimensional preload on the first and second bearings 36, 38 so as to maintain the second output gear 26 in alignment with the propeller shaft 16 during operation of the marine drive. In the present examples, the dimensional preload is a function of relative geometries of the first and second bearings 36, 38 and of the open interior 72 of the bearing carrier 70, as will be described further herein below.

Bearing manufacturers perform a bearing life analysis on their bearings to determine an allowable range of preloads that will support a given required performance and bearing life. The present inventors have realized that dimensional preload can be provided by specifying dimensions of various components in the gear assembly that control bearing preload (such as a width of the inner spacer 66, a width of the outer spacer 68, diameter(s) of the open interior 72 of the bearing carrier 70, and a diameter of the gear hub 30) such that the "loosest" possible and "tightest" possible dimensional preloads fall within the range specified by the bearing manufacturer. For example, the present inventors recognized that it is not only the relative axial positioning of the inner races and outer races 46, 48 that affect preload, but also the fits between the outer races 46, 48 and the bearing carrier 70, the fits between the inner races 42, 44 and the gear hub 30, and the stand height of the bearings 36, 38. Each of these geometries can be taken into account, along with the geometry of the open interior 72 of the bearing carrier 70, in order to provide dimensional preload that will stabilize the bearings 36, 38 during operation of the marine drive.

In one example, one of the inner spacer 66 and the outer spacer 68 has a width (parallel to the axis of the propeller shaft 16) that prevents contact between first and second bearing cages 54, 56 (see FIG. 3) of the respective first and second bearings 36, 38. The other of the inner spacer 66 and the outer spacer 68 has a width (again, parallel to the propeller shaft axis) that is a function of at least the width of the one of the inner spacer 66 and the outer spacer 68, a static (non-loaded) stand height S1 of the first bearing 36, a change in stand height of the first bearing 36 due to the press fit inside the bearing carrier 70, a static (non-loaded) stand height S2 of the second bearing 38, a change in stand height of the second bearing 38 due to the press fit, the heights H1, H2 of the inner races 42, 44 of the bearings 36, 38, and a desired dimensional preload. One specific example will be described further herein below. Note that the widths of the bearings 36, 38, and thus widths of the spacers 66, 68, may be the same if the first and second bearings 36, 38 are roller bearings or other symmetrical bearings. However, these widths will not be the same if the bearings 36, 38 are tapered roller bearings, as shown herein.

Together, the second output gear 26, the first bearing 36, the second bearing 38, the inner spacer 66, the outer spacer 68, and the retainer nut 74 make up a gear assembly 76 located in the gear case 10. These components are preassembled by placing the first bearing 36, the inner spacer 66, the outer spacer 68, the second bearing 38, and then the retainer nut 74 on the hub 30. The hub end of the gear assembly 76 is then pressed into the open interior 72 of the bearing carrier 70. Because of the relative outside diameter of the gear assembly 76 with respect to the inside diameter(s) of the open interior 72 of the bearing carrier 70 (described below), such pressing requires a high amount of force, and may need to be undertaken by hydraulic or mechanical presses. The gear assembly 76 and the bearing carrier 70 are rotated with respect to one another by way of special tooling during such insertion, in order to ensure that the bearings are seated correctly within the races. Such relative rotation is undertaken simultaneously with the pressing of the gear assembly 76 into the bearing carrier 70.

According to the present disclosure, no shims or readily elastically deformable components such as springs, elastomeric rings, and/or crush washers are provided in the gear assembly 76. Rather, the dimensional preload, which is a function of relative geometries of the first and second bearings 36, 38 and of the open interior 72 of the bearing carrier 70, is relied upon to provide stiffness to the bearing assembly 34 and prevent tipping thereof with respect to the propeller shaft 16. Specifically, referring to FIG. 5, the inner spacer 66 has a first surface 66a that contacts the inner race 42 of the first bearing 36 and an opposite, second surface 66b that contacts the inner race 44 of the second bearing 38. The outer spacer 68 has a first surface 68a that contacts the outer race 46 of the first bearing 36 and an opposite, second surface 68b that contacts the outer race 48 of the second bearing 38. Such contact is direct contact and requires no shims or elastically deformable components due to the specifically designed widths of the inner and outer spacers 66, 68. The outer races 46, 48 of the first and second bearings 36, 38 can only come within a predetermined distance of one another due to the presence of the outer spacer 68, no matter how much the retainer nut 74 is torqued. The inner races 42, 44 of the first and second bearings 36, 38 can only come within a predetermined distance of one another due to the presence of the inner spacer 66, no matter how much the retainer nut 74 is torqued.

As noted, the bearing carrier 70 is located in the gear case 10 and has the open interior 72 that surrounds the propeller shaft 16. The gear assembly 76 is press fit within the bearing carrier 70, and thus the diameter(s) of the open interior 72 of the bearing carrier 70 can alternatively or additionally be sized based on geometries of the first and second bearings 36, 38 and predetermined amounts by which the bearing carrier 70 and first and second bearings 36, 38 will expand when the marine drive is at its operating temperature, so as to provide a dimensional preload to the assembly. For example, the open interior 72 of the bearing carrier 70 has a first diameter D1 equal to an outside diameter of the first bearing 36 plus a predetermined amount of expansion of the first bearing 36 at an operating temperature of the marine drive, minus a predetermined amount of expansion of the bearing carrier 70 at the operating temperature, minus a predetermined amount of interference at room temperature.

The open interior 72 of the bearing carrier 70 further has a second diameter D2 equal to an outside diameter of the second bearing 38 plus a predetermined amount of expansion of the second bearing 38 at the operating temperature, minus a predetermined amount of expansion of the bearing carrier 70 at the operating temperature, minus a predetermined amount of interference at room temperature. Thus, before the assembly is at the operating temperature, the bearings 36, 38 are press fit into the open interior 72 of the bearing carrier 70 and are slightly compressed thereby, i.e., dimensionally preloaded. The diameters D1, D2 of the open interior 72 of the bearing carrier 70 are controlled to be tight enough that the dimensional preload on the bearings 36, 38 is maintained inside a preload window that provides a desired life of the bearings 36, 38, even once the operating temperature of the marine drive is reached, when both the bearing carrier 70 and the bearings 36, 38 expand due to heat.

Those having ordinary skill in the art will realize that as the propeller shaft 16 and thus the components in the gear assembly 76 rotate, after an initial start-up time, the components will begin to heat up due to friction, as the inner races of the bearings 36, 38 rotate with respect to the outer races. At the same time, hot exhaust from the engine of the marine drive will be passed through the gear case 10, further heating the components in the gear assembly 76. These gear assembly 76 and the bearing carrier 70, both of which are made of metal, will therefore expand according to the types of metal of which they are made and according to their geometries. Known material properties and known equations can be used to determine the amounts by which the first and second bearings 36, 38 will expand and the amount by which the bearing carrier's inner diameter(s) will expand at such hotter operating temperatures.

Figure 5:
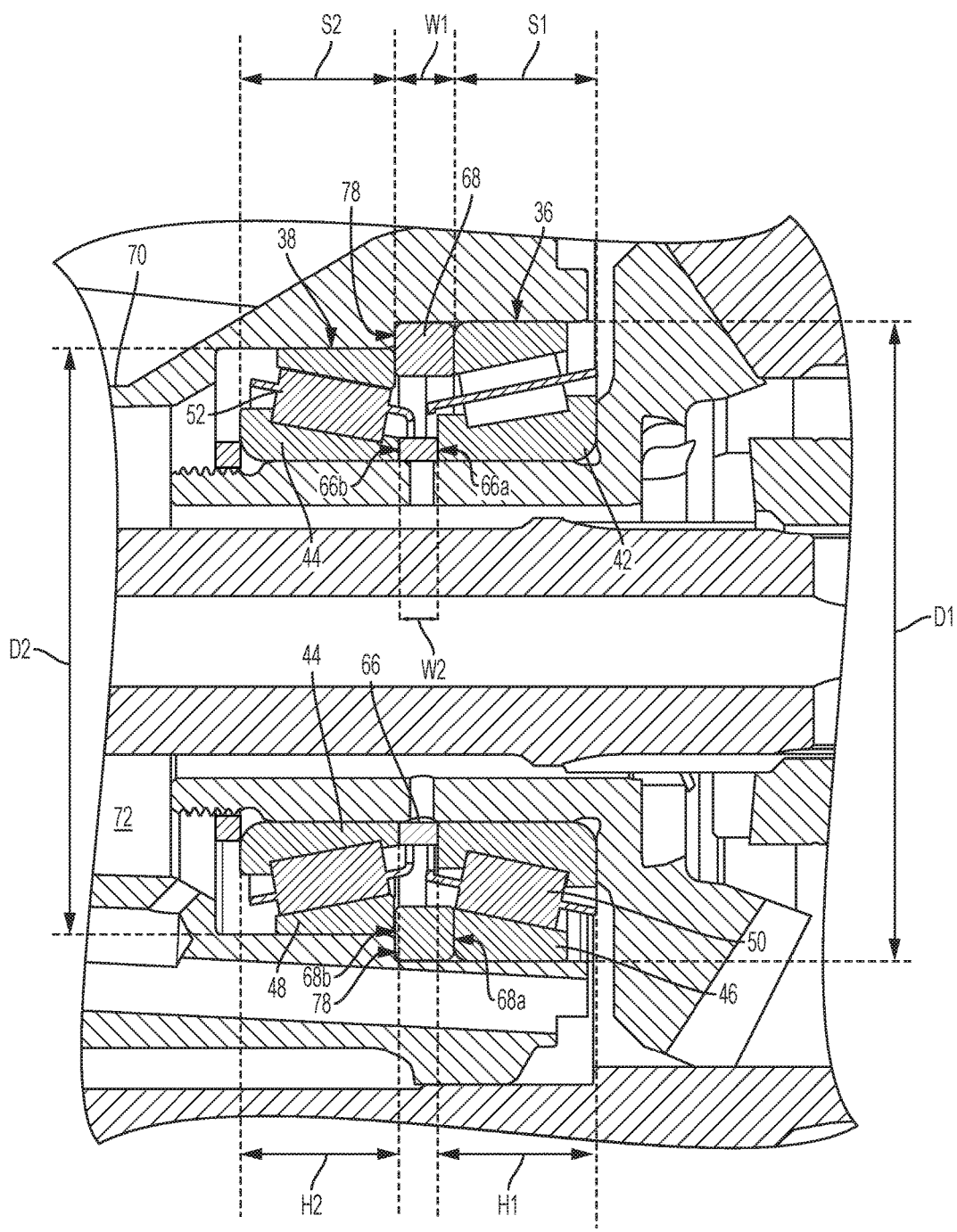
FIG. 5 is a detailed view of a portion of FIG. 2.

In the present example, the first and second bearings 36, 38 have different outside diameters, and the open interior 72 of the bearing carrier 70 has a stepped surface 78. As shown in FIG. 5, the first bearing 36 has a greater outside diameter than the second bearing 38, and the stepped surface 78 of the bearing carrier's open interior 72 steps radially inwardly from the greater first diameter D1 surrounding the first bearing 36 to the lesser second diameter D2 surrounding the second bearing 38. Note that the second surface 68b of the outer spacer 68 not only contacts the outer race 48 of the second bearing 38, but also contacts the stepped surface 78 of the bearing carrier's open interior 72.

The outer spacer 68 may be made of aluminum, while the inner spacer 66 may be made of steel. Other metals could instead be used. The outer spacer 68 could be built into (i.e., integral with) the outer race 46 of the first bearing 36, and could extend between the outer race 46 and the inner surface of the bearing carrier 70. In another example, the outer spacer 68 may extend over the outer surface of the outer race 48 of the second bearing 38, between the second bearing 38 and the inner surface of the bearing carrier 70. In this instance, the stepped surface 78 of the open interior 72 might be less stepped or not stepped at all at this location. The inner spacer 66 could also be built into (i.e., integral with) one or both of the inner races 42, 44 of the first and second bearings 36, 38. In yet another example, the first and second bearings 36, 38 have the same outside diameter, and there is no stepped surface provided in the open interior 72 of the bearing carrier 70. In yet another example, the stepped surface 78 of the bearing carrier's open interior 72 is moved forwards (toward the drive shaft 12), so that it bears directly against the outer race 46 of the first bearing 36. The dimension of the stepped surface in that instance would be specifically calculated to prevent contact between the bearing cages 54, 56 of the first and second bearings 36, 38. The outer spacer 68 would still be required between the outer race 46 of the first bearing 36 and the outer race 48 of the second bearing 38, but could have reduced radial thickness due to its not needing to have the second surface 68b bear against the stepped surface 78, but only against the outer race 48.

Returning to the specific sizing of the inner and outer spacers, 66, 68, the following exemplary method could be used. First, as noted herein above, one of the spacers has a width that is selected to prevent contact between the bearing cages 54, 56 of the bearings 36, 38. The width of the other spacer is then determined as a function of at least this pre-selected width. For example, the width W1 of the outer spacer 68 can be selected to prevent contact between the bearing cages 54, 56. The width W2 of the inner spacer 66 can then be determined as a function of the width of the outer spacer 68 and of the relative geometries of the first and second bearings and of the open interior 72 of the bearing carrier 70. For example, a dimensional preload as a result of the press fit of the bearings 36, 38 into the open interior 72 of the bearing carrier 70 can be determined. This dimensional preload may be calculated as a change in stand height of the first bearing 36 plus a change in stand height of the second bearing 38 due to the press fit. The changes in stand height S can be calculated as functions of the cup angles and/or contact angles α of the first and second bearings 36, 38, of the change in the diameter of the inner races 42, 44 due to the press fit onto the gear hub 30, and of the change in diameter D of the outer races (cup diameter) of the first and second bearings 36, 38 due to the press fit, which in turn are determined as functions of the following: Poisson's ratio; Young's modulus; the inner and outer diameters of the bearings 36, 38, gear hub 30, and bearing carrier 70; and other constants and measurable variables.

In one specific example, the width of the inner spacer 66 is determined as the sum of the first bearing stand height S1, the second bearing stand height S2, the outer spacer's predetermined width W1, and the calculated dimensional preload as a result of the press fit, minus the sum of the first bearing inner race height H1, the second bearing inner race height H2, and an offset (which biases the width of the inner spacer 66 to a smaller value). The inner spacer 66 having the calculated width W2 can then be tested in a marine drive to determine if it provides the bearing life expected from such preloading. If, for example, the bearing life is less than expected, this may be due to the manufacturing tolerances of the bearings 36, 38, and a desired extra dimensional preload may need to be taken into account. The width of the inner spacer 66 would then be the sum of the first bearing stand height S1, the second bearing stand height S2, the outer spacer's predetermined width W1, and the calculated dimensional preload as a result of the press fit, minus the sum of the first bearing inner race height H1, the second bearing inner race height H2, the offset, and the desired extra dimensional preload. Note that in other examples, the width of the inner spacer 66 could initially be set such that the bearing cages 54, 56 do not interfere with one another, and the width of the outer spacer 68 calculated thereafter.

Referring back to FIG. 2, as mentioned herein above, during operation of the propeller shaft 16, a force F1 is applied to the second output gear 26, which causes a moment force (F1×X) on the bearing assembly 34. Another moment force (not shown) is caused by the torque on the driven gear. This also acts on the bearing assembly 34. These moments each tend to cause the misalignment and premature failure discussed herein above. According to the present disclosure, the bearing assembly 34 and spacers 66, 68 together act to reduce the misalignment associated with these moments and thus prolong the life of the second output gear 26. More specifically, the respective bearings 36, 38 are set at the noted angles, so as to spread (increase) the effective distance D between the bearing effective centers. Further, the spacers 66, 68 preload the bearing assembly 34 so as to increase the bearing load zone and decrease or eliminate the clearance that the second output gear 26 could otherwise tip through. Advantageously, this arrangement enhances stiffness, reduces running noise, enhances the accuracy of shift guidance, compensates for wear and settling during operation, and provides longer service life.

The apparatus shown in FIG. 3 is easy to assemble apart from the rest of the gear case 10 and marine drive and therefore provides significant packaging, delivery and installation advantages. For example, the gear, bearing, and carrier assembly process is simplified when compared to other tapered roller bearing preloading techniques: all components in the gear assembly 76 can be pressed together with no special consideration required for pre-load control, as it is taken into account by the predetermined dimensions of the spacers 66, 68 and open interior 72 of the bearing carrier 70. In other words, the person assembling the gear assembly 76 need not torque the retainer nut 74 to a particular position to achieve a particular force or rolling torque preload. This saves time and prevents error during assembly, as the installer no longer needs to measure bearing dimensions or part dimensions prior to assembly.

The embodiments shown in the drawings can be modified with this spirit of the claims set forth herein below. For example, although physically separate first and second bearings are shown in the drawings, the first and second bearings can be part of a single "hybrid bearing" or "double row bearing" and still fall within the meaning of "first and second bearings." The embodiments can be used with different gear case, transmission, and propeller configurations from what is shown in the drawings, including single and multiple propeller configurations.

In the above description, certain terms have been used for brevity, clarity, and understanding. No unnecessary limitations are to be inferred therefrom beyond the requirement of the prior art because such terms are used for descriptive purposes and are intended to be broadly construed. The different assemblies and methods described herein may be used alone or in combination with other assemblies and methods. It is to be expected that various equivalents, alternatives and modifications are possible within the scope of the appended claims. Each limitation in the appended claims is intended to invoke interpretation under 35 U.S.C. § 112(f), only if the terms "means for" or "step for" are explicitly recited in the respective limitation.

What is claimed is:

1. A marine drive comprising:
an output gear connected to a driveshaft such that rotation of the driveshaft causes rotation of the output gear, wherein the output gear comprises a beveled gear and a hub that is transversely oriented with respect to the driveshaft;
a propeller shaft that is transversely oriented with respect to the driveshaft and extends through an open interior of the hub;
a first bearing and an adjacent second bearing located on the hub and supporting rotation of the output gear, wherein the first bearing is located closer to the beveled gear than the second bearing, and wherein each of the first and second bearings has an inner race and an outer race;
an inner spacer located on the hub and sandwiched between the respective inner races of the first and second bearings;
an outer spacer sandwiched between the respective outer races of the first and second bearings; and
a bearing carrier having an open interior that surrounds the propeller shaft and holds the first and second bearings therein by way of a press fit;
wherein the inner and outer spacers and the bearing carrier are dimensionally sized to provide a dimensional preload on the first and second bearings so as to maintain the output gear in alignment with the propeller shaft during operation of the marine drive.

2. The marine drive of claim 1, wherein the dimensional preload is a function of relative geometries of the first and second bearings and of the open interior of the bearing carrier.

3. The marine drive of claim 2, wherein:
the inner spacer has a first surface that contacts the inner race of the first bearing and an opposite, second surface that contacts the inner race of the second bearing; and
the outer spacer has a first surface that contacts the outer race of the first bearing and an opposite, second surface that contacts the outer race of the second bearing.

4. The marine drive of claim 2, wherein:
the open interior of the bearing carrier has a first diameter equal to an outside diameter of the first bearing plus a predetermined amount of expansion of the first bearing at an operating temperature of the marine drive, minus a predetermined amount of expansion of the bearing carrier at the operating temperature, minus a predetermined amount of interference at room temperature; and
the open interior of the bearing carrier has a second diameter equal to an outside diameter of the second bearing plus a predetermined amount of expansion of the second bearing at the operating temperature, minus the predetermined amount of expansion of the bearing carrier at the operating temperature, minus the predetermined amount of interference at room temperature.

5. The marine drive of claim 4, wherein the first and second bearings have different outside diameters, and the open interior of the bearing carrier has a stepped surface.

6. The marine drive of claim 5, wherein the first bearing has a greater outside diameter than the second bearing, and the stepped surface of the bearing carrier's open interior steps radially inwardly from the first diameter to the second diameter.

7. The marine drive of claim 6, wherein the outer spacer has a first surface that contacts the outer race of the first bearing and an opposite, second surface that contacts the stepped surface of the bearing carrier's open interior and the outer race of the second bearing.

8. The marine drive of claim 2, wherein:
one of the inner spacer and the outer spacer has a width that prevents contact between first and second bearing cages of the respective first and second bearings; and
the other of the inner spacer and the outer spacer has a width that is a function of at least the width of the one of the inner spacer and the outer spacer, a change in stand height of the first bearing due to the press fit, a change in stand height of the second bearing due to the press fit, and a desired dimensional preload.

9. The marine drive of claim 1, wherein both the first and second bearings are tapered roller bearings arranged such that their respective effective load centers are disposed so as to maximize a distance there between.

10. The marine drive of claim 1, further comprising a retainer nut located on the hub adjacent the second bearing, opposite the first bearing.

11. A marine drive comprising:
a driveshaft extending into a gear case of the marine drive;
a propeller shaft transversely oriented with respect to the driveshaft and operably coupled to the driveshaft so as to be rotated thereby; and
a gear assembly located in the gear case and including:
an output gear connected to the driveshaft such that rotation of the driveshaft causes rotation of the output gear, wherein the output gear comprises a beveled gear and a hub that surrounds the propeller shaft;
a first bearing and an adjacent second bearing located on the hub and supporting rotation of the output gear, wherein the first bearing is located closer to the beveled gear than the second bearing, and wherein each of the first and second bearings has an inner race and an outer race;
an inner spacer located on the hub between the respective inner races of the first and second bearings and an outer spacer between the respective outer races of the first and second bearings, wherein the inner and outer spacers are dimensionally sized to provide a dimensional preload on the first and second bearings so as to maintain the output gear in alignment with the propeller shaft during operation of the marine drive; and
a retainer nut located on the hub adjacent the second bearing, opposite the first bearing.

12. The marine drive of claim 11, wherein the inner spacer has a first surface that contacts the inner race of the first bearing and an opposite, second surface that contacts the inner race of the second bearing.

13. The marine drive of claim 12, wherein the outer spacer has a first surface that contacts the outer race of the first bearing and an opposite, second surface that contacts the outer race of the second bearing.

14. The marine drive of claim 11, further comprising a bearing carrier located in the gear case and having an open interior that surrounds the propeller shaft;
wherein the first and second bearings are held within the bearing carrier by way of a press fit; and
wherein the dimensional preload is a function of relative geometries of the first and second bearings and of the open interior of the bearing carrier.

15. The marine drive of claim 14, wherein:
one of the inner spacer and the outer spacer has a width that prevents contact between first and second bearing cages of the respective first and second bearings; and
the other of the inner spacer and the outer spacer has a width that is a function of at least the width of the one of the inner spacer and the outer spacer, a change in stand height of the first bearing due to the press fit, a change in stand height of the second bearing due to the press fit, and a desired dimensional preload.

16. The marine drive of claim 14, wherein the first bearing has a greater outside diameter than the second bearing, and the bearing carrier's open interior has a stepped surface that steps radially inwardly from a greater first diameter surrounding the first bearing to a lesser second diameter surrounding the second bearing.

17. The marine drive of claim 16, wherein:
the first diameter is equal to the outside diameter of the first bearing plus a predetermined amount of expansion of the first bearing at an operating temperature of the marine drive, minus a predetermined amount of expansion of the bearing carrier at the operating temperature, minus a predetermined amount of interference at room temperature; and
the second diameter is equal to the outside diameter of the second bearing plus a predetermined amount of expansion of the second bearing at the operating temperature, minus the predetermined amount of expansion of the bearing carrier at the operating temperature, minus the predetermined amount of interference at room temperature.

18. The marine drive of claim 11, wherein no shims or readily elastically deformable components are provided in the gear assembly.

19. The marine drive of claim 11, wherein both the first and second bearings are tapered roller bearings arranged such that their respective effective load centers are disposed so as to maximize a distance there between.

20. The marine drive of claim 11, wherein at least one of the inner and outer spacers is integral with a respective at least one of the inner and outer races of the first and second bearings.

* * * * *